(12) United States Patent
Ranganathan et al.

(10) Patent No.: US 6,801,811 B2
(45) Date of Patent: Oct. 5, 2004

(54) SOFTWARE-DIRECTED, ENERGY-AWARE CONTROL OF DISPLAY

(75) Inventors: Parthasarathy Ranganathan, Palo Alto, CA (US); James Gettys, Carlisle, MA (US); William Riis Hamburgen, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 349 days.

(21) Appl. No.: 10/033,738

(22) Filed: Dec. 27, 2001

(65) Prior Publication Data

US 2003/0135288 A1 Jul. 17, 2003

(51) Int. Cl.$^7$ .............................................. G05B 11/01
(52) U.S. Cl. .............................. 700/22; 700/21; 700/79; 700/12; 700/13; 700/14; 713/300; 713/323; 713/324; 713/320; 713/321; 345/211; 345/212; 345/213; 365/226; 365/227
(58) Field of Search ........................ 700/21, 22, 12–14, 700/79; 713/300, 320, 321, 322, 323, 324; 345/212–213, 98; 365/226–227, 210, 189.09; 745/204, 212, 211, 213, 98

(56) References Cited

U.S. PATENT DOCUMENTS

| | | | | |
|---|---|---|---|---|
| 5,365,487 A | * | 11/1994 | Patel et al. ................... | 365/226 |
| 5,598,565 A | * | 1/1997 | Reinhardt .................... | 713/323 |
| 5,619,707 A | * | 4/1997 | Suboh ......................... | 713/322 |
| 5,796,391 A | * | 8/1998 | Chiu et al. ................... | 345/204 |
| 6,339,417 B1 | * | 1/2002 | Quanrud ...................... | 345/98 |

OTHER PUBLICATIONS

Jason Flinn & M. Satyanarayanan, "Energy–aware adaptation for mobile application," Dec. 1999, ©1999 ACM, School of Computer Science, Carnegie Mellon University.
Noboru Kamijoh, Tadanobu Inoue, C. Michael Olsen, M.T. Raghunath, Chandra Narayanaswami, "Energy trade–offs in the IBM Wristwatch computer," ©1999 *IEEE*, pp. 133–140.
Stephen Shankland, "Time to buy IBM's Linux watch?," Mar. 26, 2001, *ZDNet UK News*, "http://news.zdnet.co.uk/story/0,,t269–s2085273,00.html".
Richard Shim, "Toshiba goes organic with new displays," May 31, 2001, *ZDNet UK News*, "http://news.zdnet.co.uk/story/0,,t269–s2087864,00.html".
"Samsung Launches PDA and Mobile Phone Combined," Jul. 19, 2001, *Samsung Electronics Mobile Phone News*, "http://samsungelectronics.com/mobile_phone/product_news/mobile_..".
Walter S. Mossberg, "Samsung Embeds Cellphone Inside Palm in New I300 Device," Aug. 30, 2001, "http://ptech.wsj.com/archive/ptech–20010830.html".

* cited by examiner

*Primary Examiner*—Ramesh Patel (57) ABSTRACT

A method and system for reducing energy consumption of a display in a computer system. The method includes profiling screen usage patterns and the impact of the screen usage patterns on energy consumption by the display; deriving an energy model based on the screen usage patterns; determining when to control the display in order to decrease its energy consumption; determining which screen portions of the display and what display parameters to control based on the energy model; and for each portion of the display to be controlled, controlling its display parameters, wherein the screen portions are controlled to attain energy conservation.

32 Claims, 9 Drawing Sheets

SOFTWARE-DIRECTED, ENERGY-AWARE CONTROL OF DISPLAY

BACKGROUND OF THE INVENTION

1. Field of the Invention

This application relates to energy savings in computer displays and particularly to energy savings in displays of mobile computing systems.

2. Background Art

Mobile computing systems require batteries as an energy source. Mobile computing devices that are not powered by solar cells or self-winding mechanical devices, are powered by rechargeable or non-rechargeable batteries. In meeting the energy needs of mobile computing systems the challenge is to extend battery life beyond a minimal acceptable duration. Ways to increase battery life include increasing the capacity of batteries. Battery life is approximated to the relationship between battery capacity and the average power consumed. Typically, however, increased capacity translates to larger, heavier and more costly batteries. Moreover, rechargeable batteries hold less energy than non-rechargeable batteries. By comparison to battery-powered devices, computer systems such as desktop computers, servers and the like that are powered by electric-outlet-fed power-supplies the energy consumption management has to do with conserving electricity. Thus, whichever power source is used, the design of computing systems must still be biased toward energy conservation.

Energy wise, display subsystems are among the largest consumers of any computing system components. A display subsystem is broadly defined as any combination of the hardware and software modules associated with the visual representation of data in any computing system, and is hereafter referred to simply as "display". In particular, each display subsystem includes a display panel (or cathode ray tube—CRT) and in addition it includes a display controller and display drivers corresponding to the display panel technology and an image processing system module. The image processing module provides geometry and raster processing. A raster image processor (RIP) is a hardware or combination hardware/software module that converts images described in the form of vector graphics statements into raster graphics images or bitmaps. These modules employ computations to generate each screen. A "screen" is the visual presentation (visible image) provided by a display. A system may have one or more displays and each display will have a screen with one or more windows.

Under normal display usage patterns, battery life in battery-powered devices can be extended with advances in battery technology and low-power circuit designs, including energy efficient displays. However, without more, such advances may not meet the energy needs of future mobile computing systems with power metrics dominated by normal display usage patterns.

Thus, designs for energy conservation have turned their focus to the patterns of display usage. As an example, devices have been designed with a number of power metrics to decrease the power usage, including power metrics defined by the power consumed in active mode, idle mode, sleep (inactive) mode, and the like. Changing the display usage pattern by minimizing the display usage and, in turn, energy usage, in the idle and sleep modes, can reduce the average power consumption of the display.

Another example involves reducing the number of pixels to consume less energy. Fonts, icons and graphics can be designed to minimize the number of pixels. With reduced font size the number of pixels to be turned on can be smaller. However, this approach can impact readability.

To further conserve energy, some approaches suggested the possibility of zoned backlighting. However, it was believed that design or manufacturing limitations might preclude mass-production of displays that support zoned backlighting.

It follows that, even with the foregoing approaches, further improvements directed toward achieving energy conservation are desired. The present invention addresses these and related issues.

SUMMARY OF THE INVENTION

The present invention provides a method and system for energy-aware software control of the display in order to reduce its overall power consumption. In essence, portions of the display are individually controlled by controlling their corresponding display parameters, such as brightness, color, gray-scale, refresh-rate, etc. The energy saving benefit is derived from adjusting the levels of such display parameters in a controlled manner by the energy-aware software.

The energy-aware software control of individual portions of the display can be used in several different ways. For example, screen area that is of higher importance to the user may be highlighted (e.g., brightly lit and as a result consuming higher power) while the areas of the screen that the user is not concerned about can be turned off, dimly illuminated or modified in some way to consume lower power. Alternatively, the energy-aware software control can choose to selectively turn on color or higher level of gray-scale differentiation only in areas of the screen to be highlighted or in any portions of these screen areas to be highlighted. Indeed, any properly selected part of the screen can be independently controlled to save energy by the energy-aware software control. Whichever way it is implemented, this approach will reduce the average power consumption of the display. Moreover, energy savings of the entire system will depend on the portion(s) of the screen relative to its entire area that are used in typical workloads and the contribution of the display to the total power consumption of the computing system.

As will be explained in more detail below, the present invention involves several aspects. Preferably, these features include means for enabling energy-aware control of individual portions of the screen, a model profiling screen usage patterns by typical applications and their impact on the energy consumption, means to determine when to prompt the energy-aware software control of the display, and means to determine where and how to apply the energy-aware software control.

To operate, the present invention requires the energy-aware software and hardware, i.e., a display, that enables the energy-aware software control of the display at a fine-grained level of granularity. The display hardware is required to support energy-aware control of portions of the display. Examples of display technologies include OLEDs (organic light emitting diodes), tiled displays or a multi-modal hierarchy of displays. OLEDs allow pixels to be individually controlled, while tiled display allow control over groups of pixels. The energy-aware software control exploits the hardware capability for individual control of portions of the display. This software includes a mechanism to determine the screen area of focus in which the user is interested. This mechanism is likely to vary with the various software programs. In a windows-based environment, the area of interest can be directly correlated to the window of focus or any other system parameter. Other applications may require user-initiated intervention in the form of cursor placement to identify the area of interest. Additionally, the software further includes a mechanism to determine the nature of control. For example, with OLEDs, this may include determining if pixels are turned on or off, and if a pixel is turned on, controlling its intensity. In some cases, the software may decide to vary parameters such as the color or refresh rate to control the power.

Advantages of the invention will be understood by those skilled in the art, in part, from the description that follows. Advantages of the invention will be realized and attained from practice of the invention disclosed herein.

BRIEF DESCRIPTION OF THE DRAWINGS

The accompanying drawings, which are incorporated in and constitute a part of this specification, illustrate several embodiments of the invention and together with the description, serve to explain the principles of the invention. Wherever convenient, the same reference numbers will be used throughout the drawings to refer to the same or like elements.

DETAILED DESCRIPTION OF THE INVENTION

To achieve energy conservation in computing systems, and in battery-powered computer systems to extend the battery life, the present invention proposes changing display usage patterns to reduce the energy consumption of displays. As a functional and architectural strategy, the invention contemplates energy-aware software control of displays, preferably at the pixel level of granularity. The energy-aware software control is intended to have the capacity of automatically decreasing the intensity (or other high-energy features) of portions of the display corresponding to portions of the screen. This approach is intended to provide a practicable and compelling energy conservation and, along the way, extended battery life or reduced consumption of electricity. To implement the proposed software control, the present invention targets systems with display technology that supports control of individual portions of the display, preferably at the pixel level of granularity.

Although in changing display usage patterns to conserve energy the software-directed control of the display at the pixel level of granularity is preferred, other higher levels of granularity are possible without departing from the scope and spirit of the invention. These higher levels of granularity include for example display matrix, grid, frame or tile. Whichever level of granularity is used, however, the proposed software control is directed at limiting the energy consumption of unused (or differently used) portions of the display, be it windows, background or the like. Typically, unused or differently used portions of the display are irrelevant or less relevant to the user and the idea is to put them on view differently without significantly diminishing the user's experience. The way these display portions are identified and how their energy consumption can be limited will become evident from the description below.

For any computing environment, it is important to note that, generally, a number of factors control the energy savings benefits which are derived from this approach. One factor is the effects of the energy-aware software control (in reducing the energy consumption of portions of the screen and with only the portions of interest being highlighted). These effects need to be fairly non-intrusive to the entire user experience. Another factor is the implementation of the energy-aware software control considering the given system. The implementation of this software control needs to consider system features specific to the particular system design such as the display electronics and potential energy benefits associated with it, as well as the complexity of modifying the software. Yet another factor is the relative size of the highlighted screen portion(s) as a fraction of the entire screen area. The portions of interest that are highlighted (and consume a relatively higher energy) should constitute a small enough fraction of the entire screen area in order to materially benefit from the energy savings benefits. A less obvious but important factor associated with the reduced energy consumption is the correlation between the energy-aware software control and the amount of image processing (computations) required for generating the screen. A beneficial correlation is expected between the reduction of image processing—e.g., image geometric and raster processing—and the aforementioned reduction of energy consumption for portions of the screen (when only the portions of interest are highlighted). Under the direction of the energy-aware software control, with the lesser amount of required computations, lower energy consumption can be achieved.

Particular factors are applicable to specific computing environments. For example, in a windows-based environment the window of focus (or in other environments the frame of focus) corresponds by analogy to the highlighted screen portion. In this case, the window of focus should be a small enough fraction of the entire screen area (or relative to the other windows) in order to materially benefit from the energy savings benefits.

It is further noted that energy conservation is a goal worth pursuing in any system development. Thus, the present invention is not merely focused on the energy needs of mobile computing systems. Rather, the present invention could be likewise implemented in any computing system including desktop systems (or systems powered from electrical outlets rather than batteries), high-end computing systems etc. In other words, energy management can be facilitated by the energy-aware software control in any computing system, be it battery operated or power-supply fed. Under this energy management a system may qualify for a better energy-friendly rating, etc.

To enable one of ordinary skill in the art to make and use the invention, the description of the invention is presented herein in the context of a patent application and its requirements. Although the invention will be described in accordance with the shown embodiments, one of ordinary skill in the art will readily recognize that there could be variations to the embodiments and those variations would be within the scope and spirit of the invention.

The present invention is based, in part, on the observation that energy efficiency has not been a factor considered in prior art software-directed schemes of display control. Thus, a more profound understanding of the concept of energy-aware software-controlled display can be attained from the following description of experiments and an observation of their results. In general terms, the experimentation was intended to show the correlation between screen usage and various factors such as the type of applications, user preferences, system set-up etc. To that end, any computing environment would have been suitable. And, the first order of approximation would have been set up to examine usage of the screen area of interest during regular deployment of such computing environment.

In this case, however, the observations were made while experimenting with a number of desktop computer displays in a windows-based environment. Thus, as first-order approximation, the experimentation was set up to examine the window of focus usage during regular windows-based desktop practice for a test population of five users. A detailed analysis of observed usage patterns, correlating these results to the behavior of users and applications in this particular environment, provides a framework for extrapolating these results to other environments. Moreover, it is important to keep in mind that the experimentation and observations as provided herein for the windowing environment are intended to illustrate and not limit the scope of the present invention and the way it can be exercised.

Overall, it appeared that an approach using software control of display usage in windows-based environments could have significant promise for energy conservation, thus the motivation for this invention. Indeed, it appeared possible that, on average, battery life could be doubled when using the window of focus as a first-order approximation for an energy-aware software control. (Again, with the energy-aware software control, the highlighted window (or any other frame) of focus is the area of interest to the user and

| User | Display Type | Display Resolution | Screen-Saver (minutes) |
|---|---|---|---|
| user 1 | 19" CRT | 1024 × 768 | 15 |
| user 2 | 21" CRT | 1280 × 1024 | 10 |
| user 3 | 19" Flat Panel | 1280 × 1024 | 2 |
| user 4 | 19" Flat Panel | 1280 × 1024 | 4 |
| user 5 | 19" Flat Panel | 1280 × 1024 | 15 |

From this table it can be seen that the study was based on desktop usage of the Microsoft Windows environment by 5 users where the users and their computing systems are representative of a typical range of users, systems and workloads. The workloads included for example software development applications, productivity applications, connectivity applications, etc. An application-level logger program was executed on the users' machines to profile each of them. The logger program was used to collect periodic information about (i) the current window of focus—its size, its location, and its title and (ii) the size of total screen area used (all non-minimized windows). The logging period was set to the minimum possible (one second). Simple privacy protection heuristics, were applied to mask out personal information in e-mail, calendar, appointment, contacts, task, web browser and other applications. Users were requested to set the properties of their screen savers to turn on after a reasonable time (1–15 minutes). This helped reduce the errors associated with monitoring the usage patterns when the user was not active.

The logger programs ran from 1 to 14 days and about 200,000 to 1,250,000 samples were taken. Given that the samples were taken every second, this represents a total of close to 45 days of computer usage time. The profiling included the times in which the users were idle. The time spent in the screen saver mode was used as an indication of when a user was idle, and samples were collected during the time threshold it took for the screen saver to be activated. However, this was not expected to change the results qualitatively. Factoring out the time spent in the screen saver, the active-user log sizes range from about 96,000 to about 220,000 samples; or approximately 27 to 61 hours of computer usage per user.

The next table summarizes the results for the forgoing test setup as follows:

| | | | Screen Usage for Active Samples | | | |
|---|---|---|---|---|---|---|
| User | Logged Samples | Active Samples | Mean for Window of Focus (%) | Standard Deviation (%) | Mean other windows (%) | Standard Deviation (%) |
| user 1 | 754,938 | 11,720 (32.7 hrs) | 62.8 | 38.5 | 10.6 | 21.2 |
| user 2 | 1,244,843 | 218,744 (60.7 hrs) | 57.2 | 22.3 | 11.6 | 28.5 |
| user 3 | 769,466 | 111,741 (31.0 hrs) | 46.3 | 19.7 | 30.4 | 19.7 |
| user 4 | 229,990 | 155,677 (43.2 hrs) | 36.7 | 14.5 | 34.1 | 8.8 |
| user 5 | 911,786 | 92,267 (26.7 hrs) | 43.2 | 22.7 | 32.6 | 21.1 |

The average screen usage for the window of focus: 49.2%
The average screen usage for background windows: 33.0% the energy-aware controlled screen area that is dimmed in some way is of less interest to the user.)

In setting up the experiment, the focus was on controlling the intensity, although controlling features such as color, refresh rate, resolution, etc. could have been equally applicable in this context. The user displays are characterized as follows:

The table includes the total number of samples and the number of active samples collected per user (columns 2 and 3). Additionally, this table includes information about the screen usage averaged across all the active samples. Columns 4 and 5 present the mean and standard deviation for the screen usage of the window of focus. Columns 6 and 7 present the mean and standard deviation for the additional screen area used by other non-minimized windows in the system. Logged samples, refers to the total samples collected. Active samples, refers to the samples collected when the screen saver was not active. A consideration was given to the fact that the percentage of screen usage varied significantly over the time the samples were collected, all the way from near-0 to near-100%. Also noticed were the increased clustering of points at specific screen-usage percentages, and this clustering can be correlated back to the key applications used by the users and their normal (or default) window sizes.

As can be seen from the table, screen usage for windows of focus involved only a screen area of 37% to 63% of the entire screen area. Screen usage for background windows that were not active but were not minimized involved a screen area of about 10% to 57%. Thus, on average, only about 50% of the entire screen area was used for the main window of focus. This can potentially translate to an extended battery life by a factor of two. On average, an additional 32% of the screen is used in background windows that are not minimized. Thus, even when assuming that these windows are important to the user experience, energy-aware software control of the display can potentially yield 18% improvements in the energy consumption of the display. In both these cases, however, the standard deviations are fairly high indicating a wide range in the screen usage values associated with each sample.

Summarizing the results from the samples, it was further observed that for the 5-user population, 26–87% of the samples use less than 30% of the entire screen area; 31–92% of the samples use less than 50% of the entire screen area; and 46–98% of the samples use less than 75% of the entire screen area. On average, for almost 60% of the time, less than half the entire screen area was used. This is particularly interesting since this means that for more than half the time there is the potential for conserving close to half the energy spent on the display.

Then, in order to understand the relationship between the screen usage and application behavior, samples from the 5-user profiling logs were combined and allocated to four bins. Broadly, the applications can be informally categorized as (i) access-related—web browsing and e-mail, (ii) personal productivity and code development, and (iii) system-related and application-control windows applications. For each bin, the dominating applications associated with the samples were analyzed. Overall, the various types of applications appear to have been used in a characteristic way to such environments. The bins are characterized by: (i) samples where the window-of-focus usage was between 0 and 25% of the total screen area, (ii) samples where the window-of-focus usage was between 25% and 50%, (iii) samples where the window-of-focus usage was between 50% and 75%, and (iv) samples where the window-of-focus usage was between 75% and 100%. The relationships between the screen usage and application behavior are put into a table as follows:

| Window size | Number of samples: 103,031 |
|---|---|
| 0–25% of the enitre screen area | Dominant applications: 36% Task bar, 28% X-term, 9% Program Manager, 4% Message-Compose, 23% Miscellaneous system messages (properties windows, message, volume control, active sync, file downloads, alarms and alerts, printer status, find-and-replace, organizer preferences, spell-check, real-player, wizards, status messages, file-find, password query windows, conformation windows) |

-continued

| Window size | |
|---|---|
| 26–50% of the entire screen area | Number of samples: 275,350<br>Dominant applications: 49% X-term, 11% Message-Compose, 11% Outlook, 7% Pachyderm, 22% Miscellaneous windows (mail-related windows, Internet Explorer, MS Word, Emacs, Window explorer and file navigation, Dreamweaver, Powerpoint) |
| Window size 51–75% of the entire screen area | Number of samples: 202,093<br>Dominant applications: 76% Internet Explorer, 4% Message-Compose, 3% Netscape, 17% Mis-cellaneous windows (Microsoft word, Emacs, and Acrobat reader, Powerpoint, Outlook, Pachyderm, Dreamweaver, Excel, Windows explorer and file navigation, WinLogger) |
| Window size 76–100% of the entire screen area | Number of samples: 119,675<br>Dominant applications: 25% Internet Explorer, 21% Outlook, 4% Visual C++, 4% Excel, 3% DirectX, 43% Miscellaneous windows (Microsoft Word, Excel, Visual C++, Powerpoint, Dreamweaver, Imageviewer) |

In focussing on the size of the windows associated with the various applications, two trends were observed. First, status messages and query windows typically use small window sizes; in fact, these windows constitute a significant fraction of the samples associated with smaller size windows. Second, personal-productivity applications, development applications and web-browsing and e-mail applications typically use larger portions of the entire screen area. Moreover, the portions of used screen area appear to be somewhat dependent on individual user preferences for window size, fonts, etc. For example, smaller font sizes can translate into smaller window sizes. It further appears that user preferences and pre-set defaults tend to influence the overall screen usage characteristics. For example, User 1 who used 63% of the display area, had an Internet web browser set to use 96% of the screen area. By comparison, User 5, who used on average 37% of the display area, had an Internet web browser set to use 67% of the display area. Such user-specific window sizing appears to be particularly characteristic of web browsing, email, and editor applications. In contrast, for development applications, most of the users preferred to have larger windows—possibly because of the multi-window content structure of these applications. Similarly, system-related and application-control messages typically appear to use smaller windows irrespective of the user. This is so mainly because of the relatively small content in these windows and in most cases the window sizes are predetermined by the application.

As to the influence of display resolution, insufficient sample points have been collected to make an exact correlation between display resolution and its impact on screen usage. However, in general, the only user who had a lower resolution setting (1024×768 in contrast to 1280×1024) ended up using the largest screen areas. Namely, a lower resolution can translate to larger screen area usage and, in turn, to higher energy consumption.

In sum, the results of the experimentation with desktop systems show that, on average, only 37%–63% of the entire screen area was used. As indicated before, such usage patterns can be exploited to produce substantial energy savings and in mobile computing systems material extension of battery life. Hence, a display control paradigm that highlights this portion of the screen area while reducing the energy spent on the remaining portions of the screen area can achieve significant energy conservation. It is important to note that although this user study was performed on desktop systems and display usage patterns may be different in mobile computing systems, the results of energy savings in mobile computing systems can be nonetheless profound and material.

Having demonstrated that energy aware software control of displays is a promising energy saving solution, the discussion that follows introduces the ways this solution can be implemented as well as various implementation issues. This solution requires a software program product and a hardware product that can support the functionality controlled by the software program.

Figure 1A:
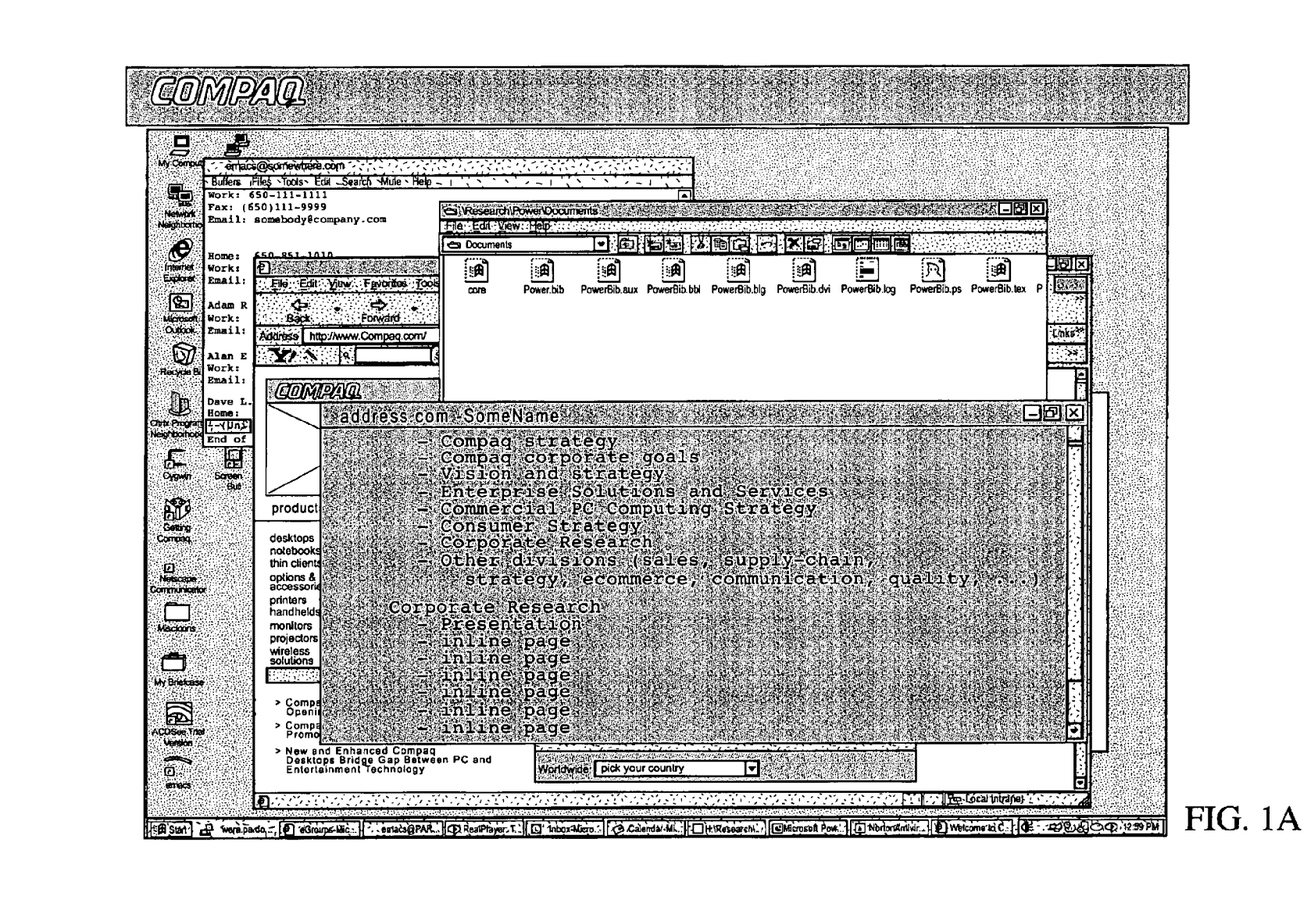
FIG. 1A shows a screen where the display is controlled in a normal, energy-unaware mode.
Figure 1B:
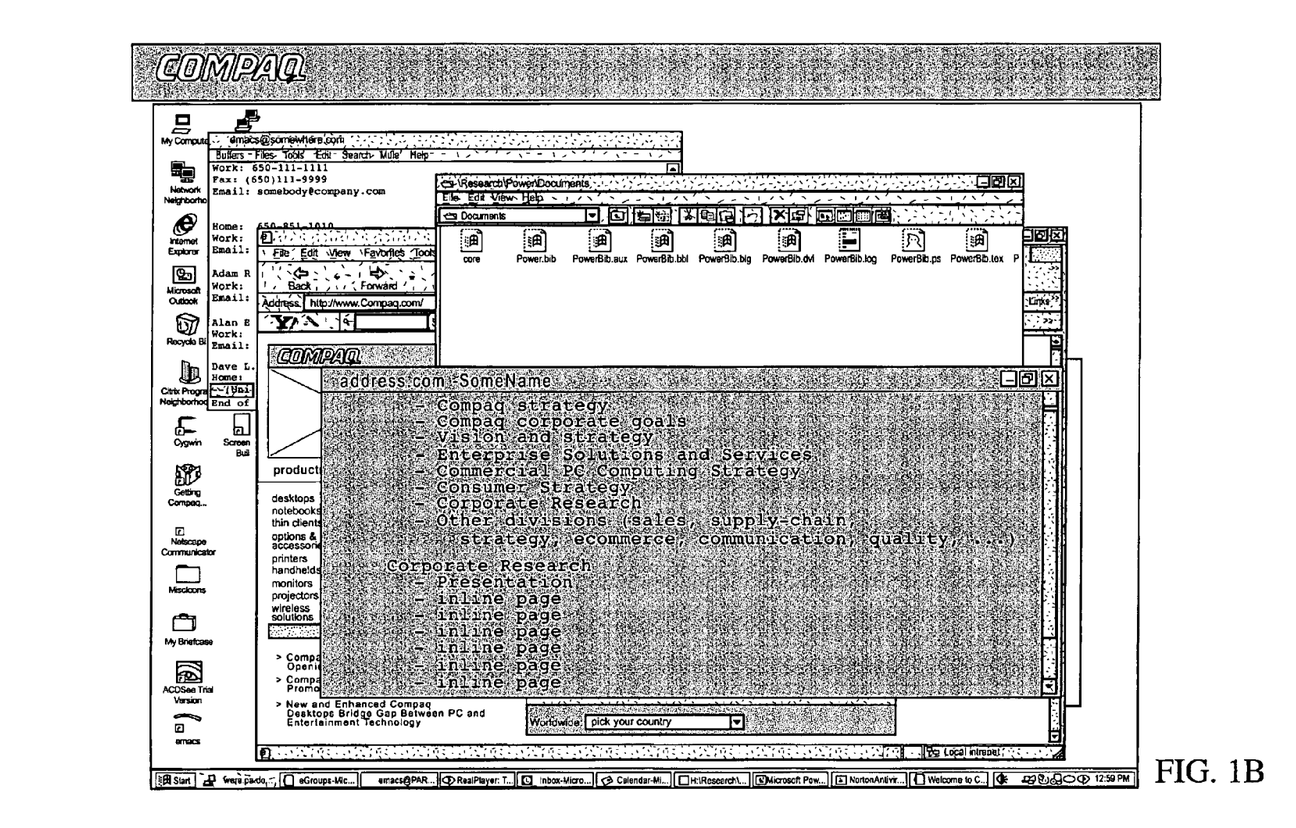
FIG. 1B shows the screen of FIG. 1A where the display is controlled by an energy-aware software-control.
Figure 2A:
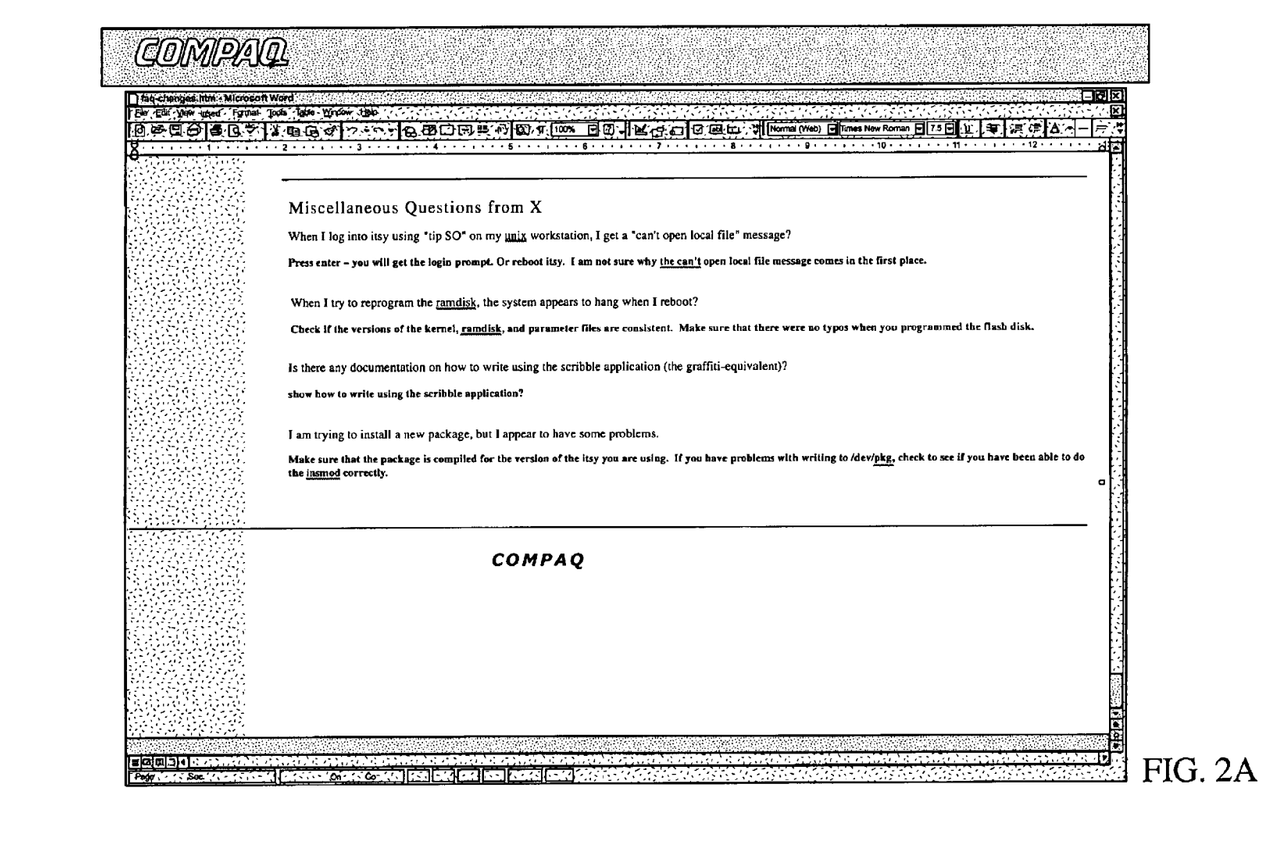
FIG. 2A provides another example of a screen where the display is controlled in a normal mode.
Figure 2B:
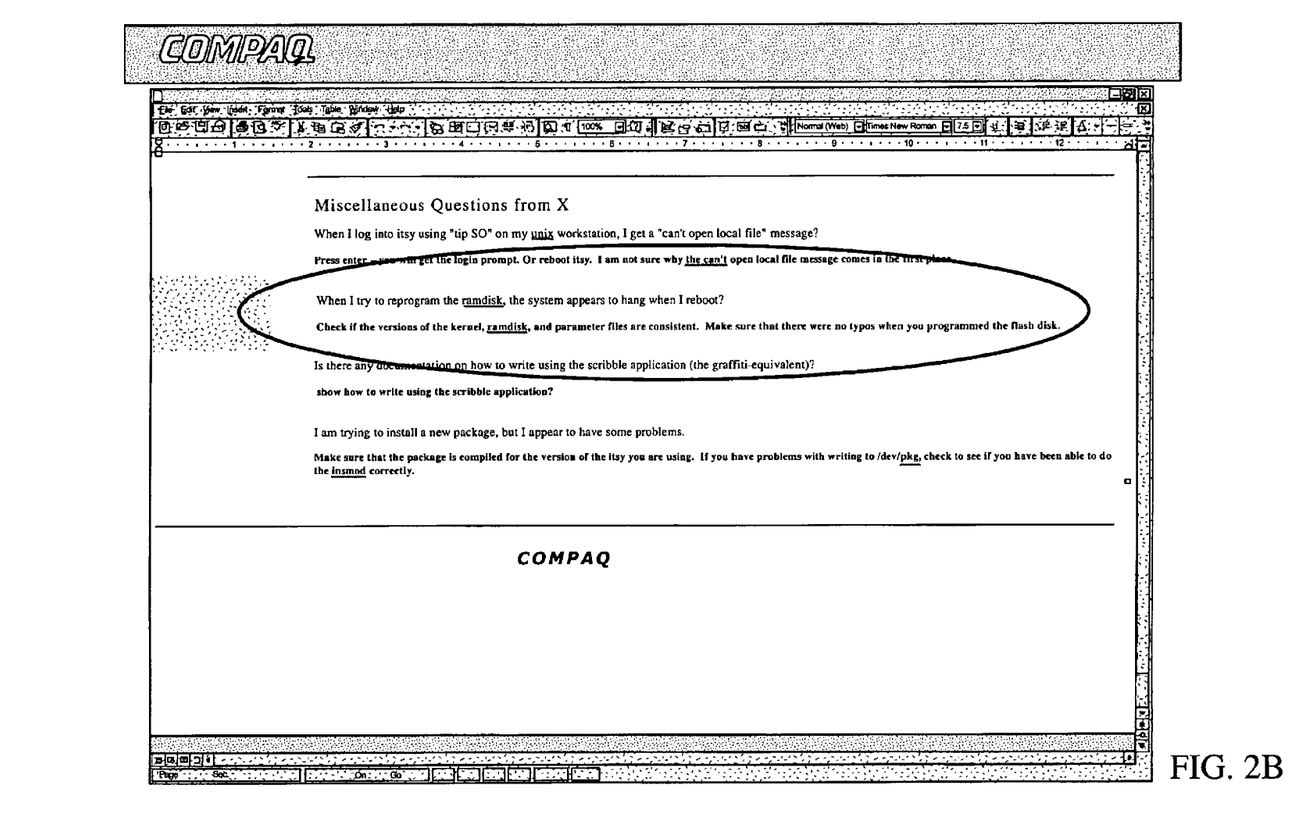
FIG. 2B shows that the screen of FIG. 2A is dimmed (energy-aware software controlled) except the portion of interest.

For example, in a windows-based environment the solution requires that environment to be reconfigured for automatically decreasing the intensity (or any other high-energy features) of the display in areas of the screen other than the window of focus. FIG. 1A shows a particular screen where the display is controlled in a normal, energy-unaware mode. By comparison, FIG. 1B, shows that screen where the display is controlled by an energy-aware software-control. As shown, the display parameters that are used to highlight the window of focus are different and consume more energy relative to the other windows in the remaining areas of the screen. FIG. 2A provides another example of a screen where the display is controlled in a normal mode. As shown, the text is displayed in a relatively even manner. By comparison, the text on the screen shown in FIG. 2B, is dimmed except the portion of interest. The highlighted text could be the text pointed to by cursor or a text produced as an answer to a query, etc.

In implementing the energy-aware software control for producing the effects as shown for example in FIGS. 1B and 2B, the impact of energy-aware software control on the user experience is an important design consideration. From FIGS. 1B and 2B, one can visualize the impact energy-aware software control can have on the user experience. Thus, although these particular examples do not appear to demonstrate an adverse impact on the user experience, such impact needs to be fairly non-intrusive in that it needs to be within the range of user tolerance.

Indeed, experience with graphic applications such as computer games where portions of the screen are selectively deemed revealed that their impact on the user experience has been fairly non-intrusive. Notably, by contrast to the context and problems addressed at hand, i.e., energy-aware display control, the computer games approach was directed at reducing the computational load on the graphics engine. Moreover, initial feedback indicates that some users may actually prefer their window of focus (or figure or text) to be highlighted relative to the other windows. There may be cases, however, in which the user may prefer to look at portions of the screen other than the window of focus (for example, cutting and pasting text from one window to another). In such cases, the implementation needs to provide a mechanism to selectively or fully turn off the intensity-control optimization. Additionally, FIGS. 1B and 2B show the background area dimmed to about 25% of its intensity. In this case, the implementation should provide a mechanism to allow the background area to be dimmed variably and support a dimming range to accommodate user preferences. Furthermore, although the examples shown in FIGS. 1B and 2B focus mainly on intensity control, alternative metrics such as color, resolution, refresh rate, etc. may be likewise controlled. A decision on what particular metric (or metrics) should be controlled will be a function of the hardware constraints, intrusiveness level imposed by controlling a particular metric and the tolerance of the user to this intrusiveness (may be a function of battery life, personal preferences, etc.).

Another implementation issue related to energy-aware software control is the hardware constraints and ability to control discrete portions of the display. This is why the present invention targets systems with display technology that supports control of individual portions of the display in order to implement the proposed energy-aware software control. Examples of display technologies that can support individual portions of a display include LCD displays technology, organic light emitting diodes (OLEDs) technology, inorganic electroluminescent (EL) display technology, field emission display (FEDs) technology, CRT (cathode ray tube) technology, etc.

The LCD display technology includes tiled LCD display panels (e.g., displays consisting of a single row of three LCD panels), passive and active matrix display panels, amorphous silicon and poly-silicon (high and low temperature), transmissive, reflective and transreflective display panels, stiff and flex substrate panels and microdisplays. With passive matrix panels, the driver circuitry addresses each element individually starting at, say, the top left-hand corner and ending at the bottom right-hand corner of the panel. In active matrix panels, instead of passive conductive strips on each panel a matrix of active driver devices (e.g., transistors) are integrated in the panel, one for each pixel.

By comparison, organic light emitting diodes (OLEDs) panels, active-matrix OLED panels and active-matrix color OLED panels have light emitting diodes that are typically built from crystalline semiconductor materials. Light-emitting diodes emit light when current flows through them. OLED technology relies on the fact that when electrified small organic molecules emit light efficiently and can be switched on and off fast enough to handle fast-moving video images. Active-matrix OLEDs (the active matrix being a backing grid of transistors associated with control of each pixel) have so far been used primarily in the context of smaller displays. In general, OLEDs have better image quality compared to LCDs (better horizontal and vertical viewing angles, higher brightness, and faster response times compared to conventional LCDs). Also, as compared to LCDs, OLEDs consume lower power.

In addition to a system with lower power consumption characteristics, preferably, the invention targets a system that can support control of the display at the pixel level of granularity. Thus, although all of the aforementioned technologies are suitable for implementing the invention, OLED technology (and other similar emissive technologies) offers lower power consumption in addition to the fine-grained control of that power consumption. In a display panel with OLEDs, pixels can be individually turned on or off and their luminance and gray scale levels can be individually controlled. In a display panel with active-matrix color OLEDs, pixels can additionally change color. Although, such features can be used to ensure better quality of images and displays (better resolution, size, and pixel count), they are used in this invention for energy-aware software control. Namely, the power saving enabling feature incorporated into OLEDs (or other suitable technologies such as multi-tiled displays or hierarchy of displays) matches the hardware requirements for supporting the energy-aware software-control of the display. However, it is important to note that no particular changes need to be made to a display if it already has the OLEDs panel or other hardware configuration (other display technology) that meets the aforementioned requirements. To achieve the energy-aware software control, the only changes will have to be made to the software.

In choosing the display a number of choices are considered. These include the cost, size, power consumption, and the quality of the display (resolution in pixels per inch, contrast, legibility, viewing angle, response time, luminous efficiency, lifetime, etc.). For implementing this invention, additional choices should be considered such as level of granularity (pixel-level, grid-level, zone-level, or tile-level) that can be controlled as well as the level of control that can be provided (turn on/turn off, luminescence intensity, grayscale, color, etc.).

Having established the hardware design requirements for implementing the invention, the energy-aware software control implementation is next addressed. It is noted that while software control of the display is applicable at several levels of the software, examples in the context of a windows-based environment may be more easily perceived. In a windows-based environment, the software implementation involves changes at two levels: (i) the software drivers that control the display, and (ii) the windows-based environment that interfaces to the display device drivers. For displays that meet the requirements outlined above, providing a simple interface to control sub-portions of the display may involve handles to the window of focus and pointers to other objects on the display area. It is contemplated that in future system implementations these levels of energy-aware software-control will be used in conjunction with one another.

In whatever environment the invention is implemented, an important aspect of the energy-aware software control implementation involves identifying the heuristics for the various parameters to minimize intrusiveness of the impact on the user experience and in providing options to turn off the energy control features. (Display technologies, such as multi-tiled displays or hierarchy of displays that provide coarser-grained control of the display may involve more complex implementations). Hence, implementation in any environment of the energy-aware software control involves determining first the screen area of focus (or of importance to the user).

As a further design consideration, since software development will have to be made, it is necessary to decide at what level of that software it will be made. Energy-aware software-control development can be made for example at the operating system level, at the windows manager level, at the applications level, or at the firmware level that interacts with the display hardware (device drivers, etc.). The software development is based on an energy model created from profiling of display usage patterns.

In order to estimate energy consumption resulting from highlighting portions of the screen and dimming other portions, the energy-aware software control can rely on the energy model. The model is composed for screen usage of typical applications that are run on the computing system. This model need not be very highly accurate but it should identify screen energy usage patterns at a high-level. For example, with windows-based environments, this model may include parameters such as the average screen area used by the window of focus, the average screen area used by other windows, and the minimum level of brightness to which the background can be dimmed (or otherwise modified) without compromising the user experience (as measured by a target focus group of test subjects). Additional parameters in the model may include areas of the screen that do not require full use of the display functionality (color, higher refresh rate, etc.) for long periods of time. These parameters can be combined with display-specific parameters characteristic to the power consumed by the display (e.g., power as a function of the number of pixels turned on, or power as a function of the brightness of the pixels turned on).

With the energy model, screen areas of focus can be determined on the basis of (i) heuristics derived from parameters in the energy model, (ii) user and/or application indications (hints) on which portions of the screen are outside the highlighted area of focus and in what manner they should be controlled, or (iii) dynamic observations of the parameters from the energy model. Whether heuristics or others, once developed they are coded into the application by the application developer as part of the energy-aware software control implementation. For the windows-based environment, heuristics can be coded into the windows manager environment.

As will be further explained below, the heuristics are likely to vary depending on the nature of the software program. In some cases, like the windows-based environment, the area of interest can be directly correlated to the window of focus or other system parameter. Other applications may require explicit user intervention in the form of directed cursor placement to identify the area of interest. A user-controlled option can be provided to turn off this energy-aware software control, if needed.

As has been previously observed, for some applications users set to maximum the size of the windows. Then again, for applications, such as development environments, multiple frames or windows were used. And, more often than not users focus only on one or more frames. Thus, in the windows-based environments the window of focus can be used as a first-order approximation of user interest. In other environments, when designing into an application energy-aware control of the display one has to rely on other pointers such as frame-of-focus, cursor position, etc. For example, in a word processing application such as the one illustrated in FIG. 2B, the higher intensity (or other means of highlighting, including gray-scale or color) is localized to a text close to the cursor (the circled area). The remaining portions of the text are dimmed (consuming lower energy).

Figure 3:
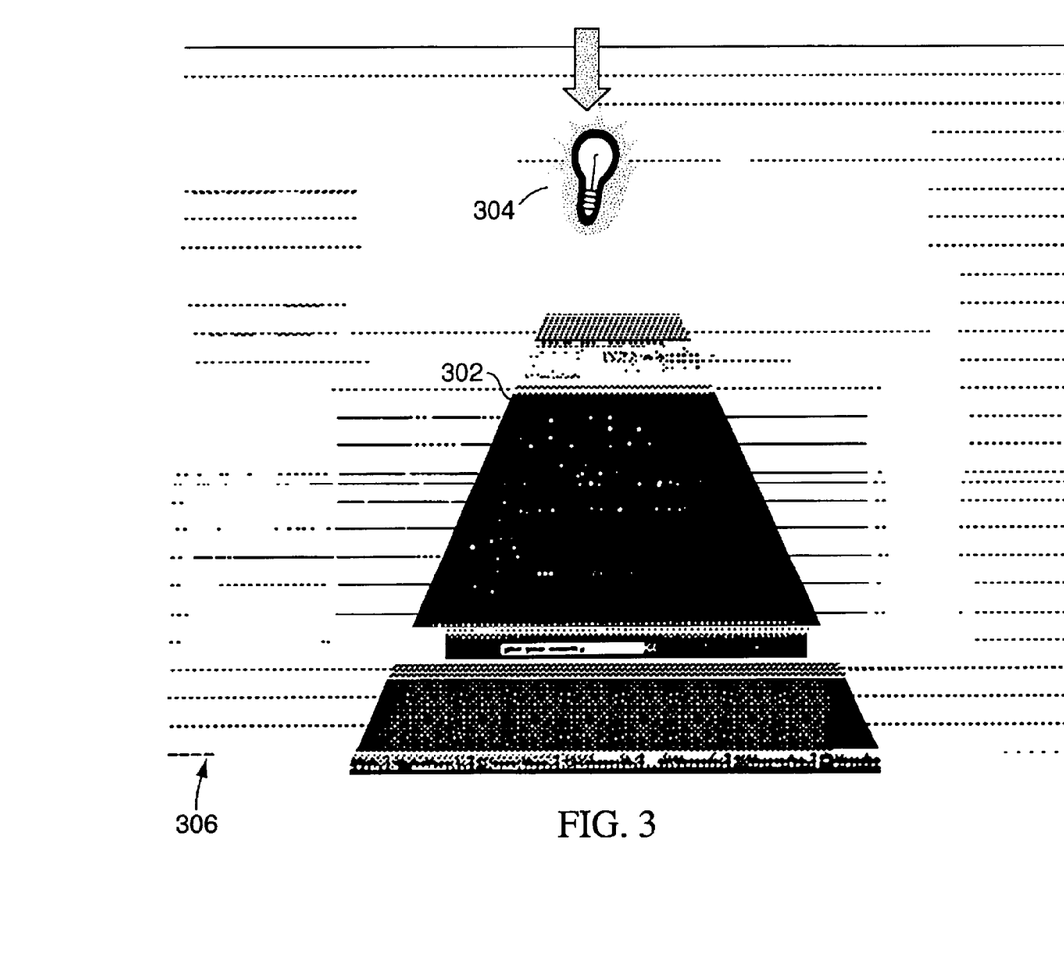
FIG. 3 shows the user selecting a screen area of focus by using a "sticky-lamp" icon to highlight ('light-up') the selected portion of the screen.

However, for read-only applications like a web browser, this solution may not be practicable. Using the pointing device may be a more viable option. This could be achieved in a number of ways. One approach involves associating the control to the user's pointing device. As illustrated in FIG. 3, even in a windows-based environment the user can select (or point to) the area of focus to be highlighted (by the energy-aware software control). In this example, the user can do so by using a "sticky-lamp" icon 304 to highlight ('light-up') specific portions of the screen 302. As in other applications, the user may choose to use multiple "sticky-lamps" for lighting-up the area of focus. An alternative implementation (not shown) might involve turning on a headlight on the mouse (or an equivalent pointing device). Then, the light could be pointed at or over the screen area (or text) of focus to be highlighted. The light could be moved down as the user reads along. Although, these less conventional user interfaces may be harder to transition into seamlessly they are particularly useful for read-only applications like web browsing, e-mail reading, etc.

Once the screen area (or window) of focus is determined, such area can be brightly lit, changed in color or set at a different gray-scale level (and consume higher power) while the remaining screen areas can be turned off, dimly illuminated, etc. (to consume lower power). To that end, the energy-aware software requires a mechanism to determine the nature of control over the power. As mentioned before, the energy-aware software can provide a fine-grained control of the power, be it control at the tile-level, grid-level or pixel-level. For example, with OLEDs, this may include determining if the pixel is turned on or off, and if the pixel is turned on, determining what should be the level of intensity. With color OLEDs, the energy-aware software may decide to vary display parameters such as color or refresh rate to control the power consumption.

The software development further involves a decision on whether the energy-aware software control will be automatically prompted to control the power consumption. For example, when the battery current can be monitored, the energy-aware software control can be automatically correlated to the monitored battery current. Alternatively, the energy-aware software control of the display may be prompted by user intervention. In laptop computers with the windows-based environment, a combined solution may be preferred. This solution will allow automatic prompting of the energy-aware software control when the battery goes below a threshold value (e.g., 15%) of its total capacity, with the added functionality the lets the user to turn on/off this feature at any time.

As mentioned before, the energy-aware software control is designed for a particular computer system and computing system environment. An example of a computer system configured in accordance with the present invention is provided in FIG. 4. In this example, the computer system 400 is battery powered 404, and the battery current can be monitored by an optional battery meter 406. The CPU 402 fetches and executes program instructions in the memory 410. For example, the CPU 402 executes instructions in the battery monitor 430 to determine the state of the battery charge. Moreover, directly of indirectly, the CPU 402 controls the display 412 and the user interface 408. As indicated, the display 412 is a subsystem that includes any combination of the hardware and software modules associated with the visual representation of data in a computing system. The illustrated display subsystem includes a display panel (or cathode ray tube—CRT) 412a and in addition it includes a display controller 412b and display drivers 412c corresponding to the display panel technology and an image processing system module 412d. The image processing module 412d provides geometry and raster processing. The display 412 is controlled, in part, by controlling its parameters 414. Depending on it features, the display parameters 414 can include intensity, brightness, color, refresh rate, gray-scale, ambient illumination, contrast, array size, number of tiles and the like, or any combination thereof. The means for enabling the energy-aware software control 420 provides the necessary instructions to allow the CPU 402 to control the display parameters 414. Although the energy-aware software control means 420 in shown as a stand-alone feature in this computer system 400, it could be implemented at any layer of a system, including the operating system 424, windowing environment (if applicable) 426, applications 428 or firmware (not specifically shown).

Figure 4:
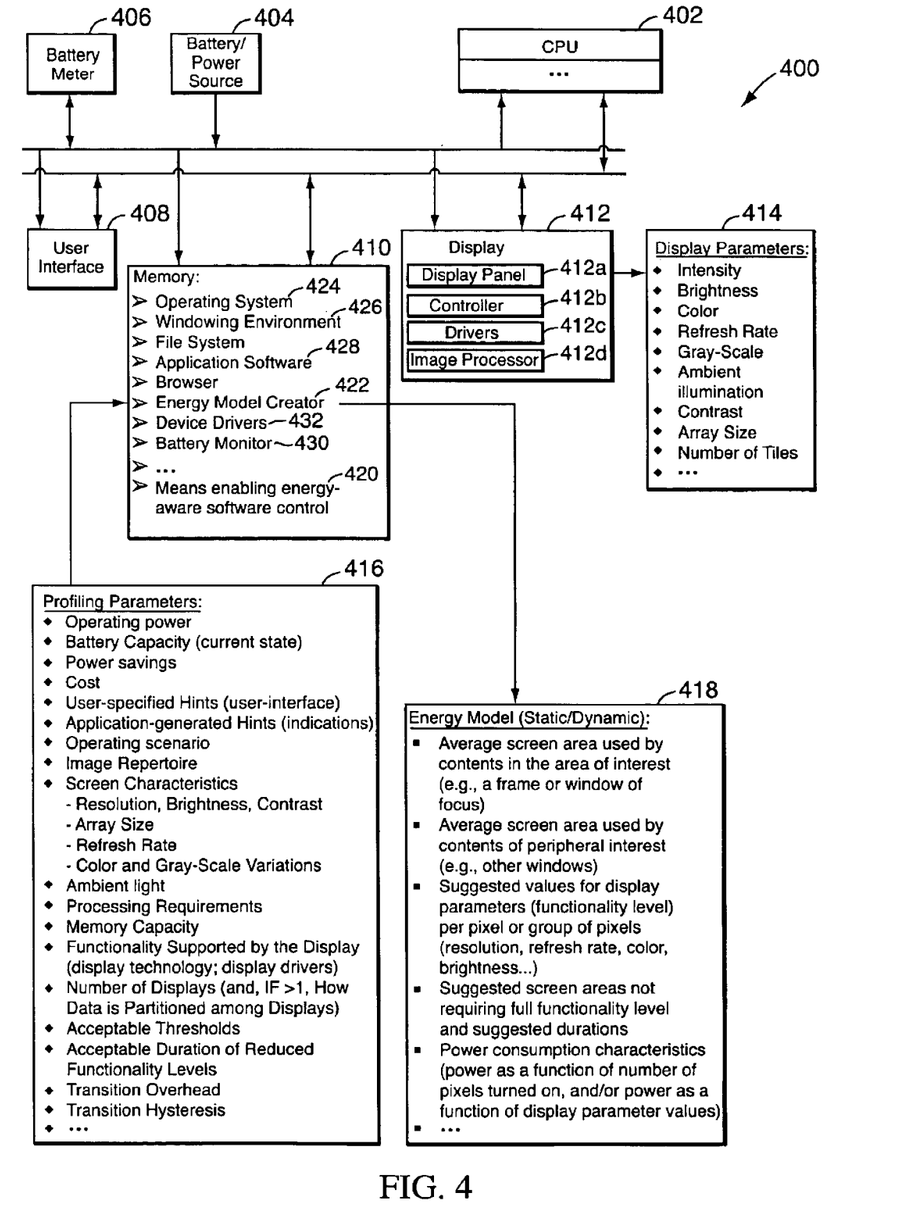
FIG. 4 is a block diagram of a system configured in accordance with the present invention.

As further mentioned before, the energy-aware software control means 420 uses the energy model 418 in determining screen areas of focus (be it windows or otherwise). To that end, the energy model creator 422 creates the energy model 418 based on profiling parameters 416 that it uses as its input. Although the energy model creator 422 is shown as a separate feature it could be implemented as part of the means for enabling the energy-aware software control 420. Likewise, the battery monitor could be implemented as an integral part of the means for enabling the energy-aware software control 420.

Figure 5:
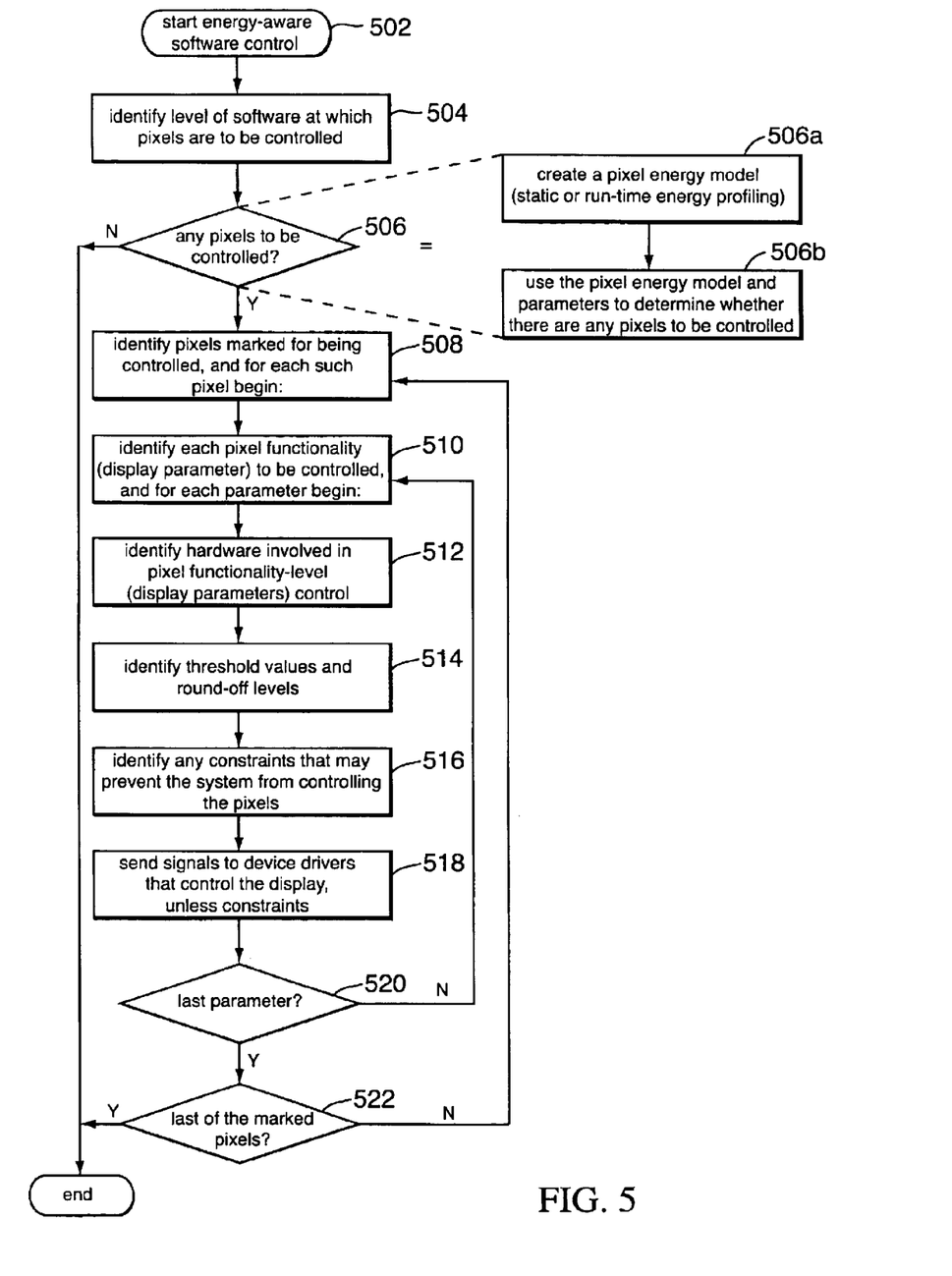
FIG. 5 is a flow diagram illustrating the energy-aware software control operations.
Figure 6A:
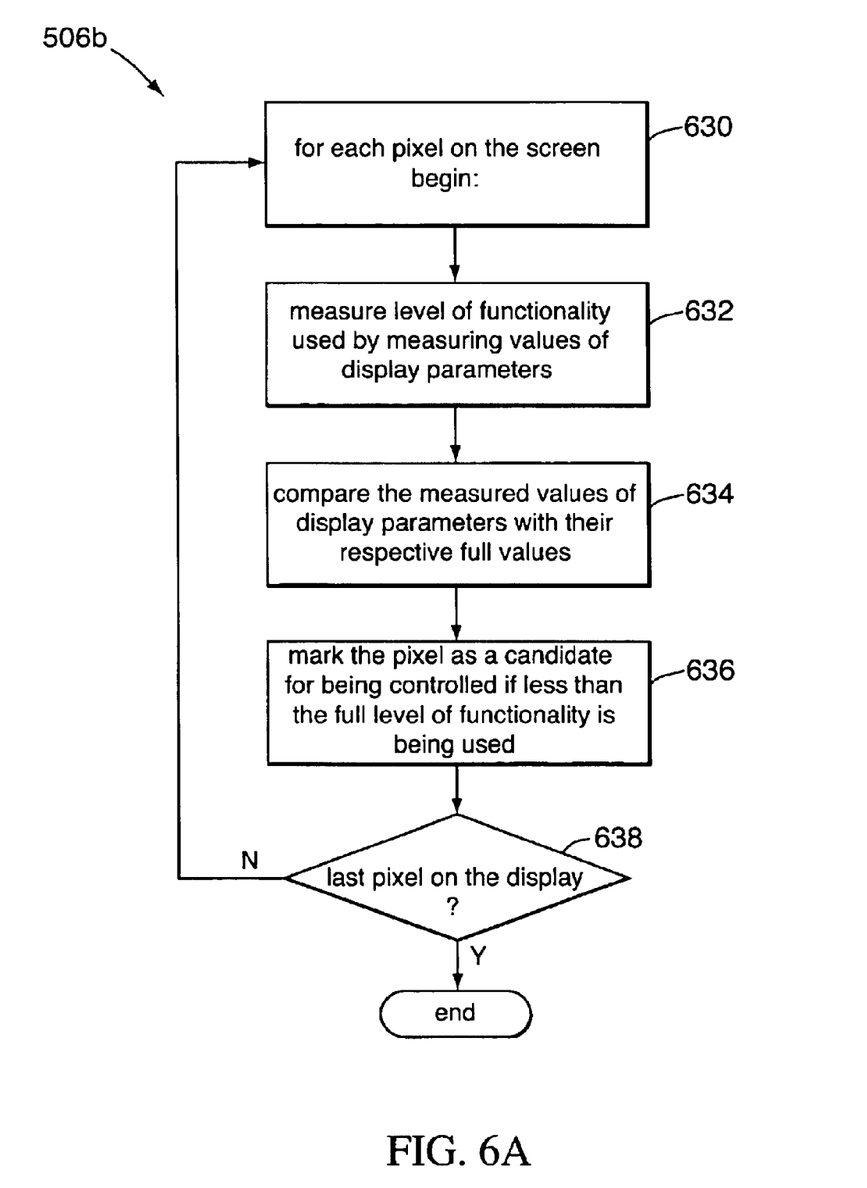
FIGS. 6A and 6B a flow diagrams that illustrate ways for identifying candidate pixels for being controlled.
Figure 6B:
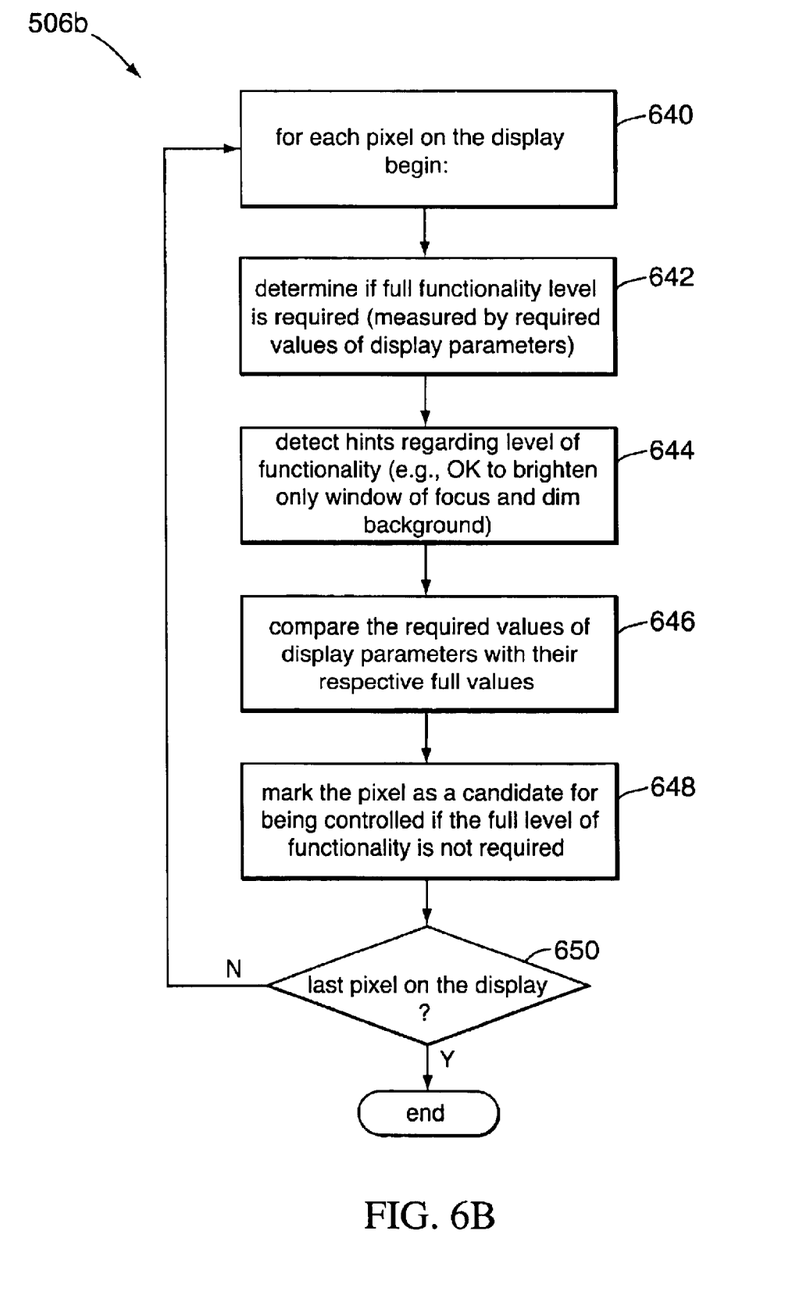

In operation, the energy-aware software control exploits the control-enabling hardware 412 for controlling the display parameters 414. FIGS. 5, 6A and 6B are flow diagrams illustrating the operation of the energy-aware software for controlling the display. This example assumes control at the pixel-level of granularity. Once the level of software at which the energy-aware software control is intended to operate is identified, 504, a determination is made as to which pixels need to be controlled 506. Examples of the level of software include the operating system level, the windows environment manager level, the application level or the firmware level.

The profiling parameters 416 (FIG. 4) depend on the type of computer system, computing environment display. Examples of profiling parameters include, but are not limited to, operating power, battery capacity (current state), power savings, cost, user-specified hints (user-interface), application-generated hints (indications), operating scenario, image repertoire, screen characteristics (display parameters such as resolution, brightness, contrast, array size, refresh rate, color and gray-scale variations), ambient light, processing requirements, memory capacity, functionality supported by the display (display technology; display drivers), number of displays (and, if >1, how data is partitioned among displays), acceptable thresholds, acceptable duration of reduced functionality levels, functionality level transition overhead, transition hysteresis.

Depending on the system configuration, the energy model creator 422 uses any combination of these profiling parameters 416 for creating the static and/or dynamic energy model 418. In the illustrated example, the energy model 418 includes, but is not limited to, information about the average screen area used by contents in the area of interest (e.g., a frame or window of focus), the average screen area used by contents of peripheral interest (e.g., other windows or background), suggested values for display parameters (functionality level) per pixel or group of pixels (resolution, refresh rate, color, brightness . . . ), suggested screen areas not requiring full functionality level and suggested duration, power consumption characteristics (power as a function of number of pixels turned on, and/or power as a function of display parameter values).

Based on the aforementioned energy model (506a, FIG. 5 and 414 FIG. 4) and display parameters heuristics derived from that model, the pixels to be controlled are identified 506b. There are a number of ways for identifying candidate pixels, two of which are described in FIGS. 6A and 6B, respectively.

Turning to FIG. 6A to illustrate one of the ways, for each pixel on the screen a process of determining if it should be marked for control begins at step 630. In this example, for each such pixel the process includes determining the level of functionality used by measuring value(s) of display parameter(s) associated with that pixel (step 632). Then, the measured parameter value or values are compared with their respective value for a full functionality level (i.e., maximum value) at step 634. The foregoing values are associated with the display parameter heuristics that are derived from the aforementioned energy model (414). That pixel is marked as a candidate for control if the measured values are lower than the maximum values of its parameters (step 636). The process repeats if that pixel is not the last to be examined (step 638).

Turning to FIG. 6B to illustrate another way, for each pixel on the screen the process of determining if it should be marked for control begins at step 640. In this example, for each such pixel the process includes determining if a full level of functionality is required by examining the required value(s) of display parameter(s) associated with that pixel (step 642). Again, such values are derived from the energy model (414). Additionally, various hints (user or application generated hints as mentioned in the discussion above) that qualify the required level of functionality (also factored in the energy model) are detected (step 644). Then, the required (and if applicable qualified) parameter value or values are compared with their respective value for a full functionality level (i.e., maximum value) at step 646. That pixel is marked as a candidate for control if the required values are lower than the maximum values of its parameters (step 648). The process repeats if that pixel is not the last to be examined (step 638).

Returning to FIG. 5, after the pixels to be controlled have been marked, and there are more pixels to control (step 506), for each pixel so marked the process begins at step 608. For that pixel, all the display parameters to be controlled are identified in step 510. The parameters to be controlled may include ambient illumination, color, gray-scale, brightness, contrast, array size, refresh rate, etc. For each controlled parameter the process determines the hardware (e.g., driver circuit) involved in controlling the parameter (step 512). For that parameter, the threshold value and round-off levels are determined in step 514. The threshold and/or round-off values to which the various functionality levels can be reduced include for example a dark pixel level which is at a 0–10% level of the maximum brightness. Acceptable thresholds provide energy savings while providing the needed functionality. Next, constraints on pixel parameters' control are identified (step 516). Examples of such constraints include loss of user interface functionality, loss in performance due to overhead in transition between functionality levels, time constraints and hardware constraints. Having considered all the thresholds, constraints and hints, the control signals can be sent to the corresponding display drivers for controlling the display 518. This process repeats for each parameter (520) and for each of the marked pixels (522).

To sum up, the present invention proposes changing display usage patterns. As a functional and architectural strategy, the invention contemplates software control of displays preferably at the pixel level of granularity. The software control is intended to automatically decrease the intensity (or other high-energy features) of portions of the display corresponding to portions of the screen. This approach is intended to provide a practicable and compelling energy conservation and, along the way, extended battery life. To implement the proposed software control, the present invention targets systems with display technology that supports control of individual portions of the display, preferably at the pixel level of granularity.

Although the present invention has been described in accordance with the embodiments shown, variations to the embodiments would be apparent to those skilled in the art and those variations would be within the scope and spirit of the present invention. Accordingly, it is intended that the specification and embodiments shown be considered as exemplary only, with a true scope of the invention being indicated by the following claims and equivalents.

What is claimed is:

1. A method for reducing energy consumption of a display in a computer system, comprising:

profiling screen usage patterns and their impact on energy consumption by the display;

deriving an energy model based on the screen usage patterns;

determining when to control the display in order to decrease its energy consumption;

determining which screen portions of the display and what display parameters to control based on the energy model; and for each portion of the display to be controlled, controlling its display parameters, wherein the screen portions are controlled to attain energy conservation.

2. The method of claim 1, wherein controlling display parameters comprises controlling color for a portion of the display.

3. The method of claim 1, wherein controlling display parameters comprises controlling gray-scale for a portion of the display.

4. The method of claim 1, wherein controlling display parameters comprises controlling a tile-level grid-level or frame-level of display granularity.

5. The method of claim 1, wherein controlling display parameters comprises controlling resolution of a portion of the display.

6. The method of claim 1, wherein controlling display parameters comprises controlling, for a portion of the display, at least two of color, brightness, resolution, contrast, and gray-scale.

7. The method of claim 1, wherein profiling screen usage patterns comprises:

identifying an average screen area used by a window of focus; and identifying an average screen area used by at least another window other than the window of focus.

8. The method of claim 1, wherein the energy model is created on the basis of profiling parameters, the energy model being a static and/or a dynamic model of screen usage patterns.

9. The method of claim 1, wherein controlling display parameters comprises highlighting text produced as an answer to a query.

10. The method of claim 1, wherein if the computer system has a computing environment that is windows-based the energy model can include an average screen area used by a window of focus, an average screen area used by other windows, and a level of minimum brightness to which a screen area can be brought.

11. The method of claim 1, wherein profiling screen usage patterns comprises:

examining types of software applications being used in a computer system;

examining preferences of a user in a computer system; and examining a set-up of a computer system.

12. The method of claim 1, wherein an area of focus on the screen that remains highlighted relative to the screen portions that are controlled consumes higher energy than these screen portions, and wherein the area of focus is determined on the basis of heuristics derived from parameters in the energy model, user or application-controlled indications as to which screen areas are outside of the area of focus, or dynamic observations of the parameters from the energy model.

13. The method of claim 1 wherein the energy model comprises screen energy usage patterns that include parameters for an average screen area used by a window of focus.

14. The method of claim 1 wherein the energy model comprises screen energy usage patterns that include parameters for determining a minimum level of brightness to which a background can be dimmed.

15. The method of claim 1 wherein profiling screen usage patterns comprises collecting information about a current window of focus.

16. The method of claim 15 wherein profiling screen usage patterns further comprises collecting information about a size of the current window of focus.

17. The method of claim 16 wherein profiling screen usage patterns further comprises collecting information about a size of total screen area used.

18. The method of claim 1, wherein the controlled display parameters are any energy-consuming parameters including one or a combination of intensity, refresh rate, gray scale and color.

19. The method of claim 1, wherein, by controlling the screen portions to attain the energy conservation, the controlling being characterized in that only screen areas of interest are highlighted, the energy-aware software control is associated with reduced amounts of computations required for image processing in producing a screen.

20. The method of claim 1 further comprising automatically controlling display parameters once power level in a battery goes below a threshold value.

21. The method of claim 1 further comprising reducing image processing computations for portions of the display to reduce energy consumption.

22. The method of claim 1, wherein controlling display parameters comprises variably dimming over a range a background area of the display.

23. The method of claim 1, wherein controlled display parameters correspond to the screen portions that can reach a threshold or round-off level.

24. The method of claim 1 further comprising controlling light emitted from a pointing device.

25. The method of claim 24 wherein controlling light emitted from a pointing device comprises emitting light at a screen area of focus.

26. A system for reducing energy consumption of a display in a computer system, comprising:
   means for profiling screen usage patterns and their impact on energy consumption by the display;
   means for deriving an energy model based on the screen usage patterns;
   means for determining when to control the display in order to decrease its energy consumption;
   means for determining which screen portions of the display and what display parameters to control based on the energy model; and
   for each portion of the display to be controlled, means for controlling its display parameters, wherein the screen portions are controlled to attain energy conservation.

27. A system for energy-aware software control in a computer system, comprising:
   a display capable of supporting control of individual portions thereof to reduce energy consumed by the display; and
   an energy-aware software control product, in a computer readable medium, embodying program code including instructions to cause the computer to perform steps, including
   profiling screen usage patterns and their impact on energy consumption by the display;
   deriving an energy model based on the screen usage patterns;
   determining when to prompt the energy-aware software control of the display in order to decrease its energy consumption;
   determining which screen portions of the display and what display parameters to control based on the energy model; and
   for each portion of the display to be controlled, controlling its display parameters, wherein the screen portions are controlled to attain energy conservation.

28. The system of claim 27, wherein the display is configured with a display technology which is one of an organic light emitting diode (OLED) technology, liquid crystal display (LCD) technology, inorganic electroluminescent (EL) display technology, field emission display technology and CRT technology, each of which being capable of supporting the energy-aware software control at a fine level of granularity corresponding to elements of the individual portions of the display.

29. The system of claim 27 wherein profiling screen usage patterns comprises:
   collecting information about a size of a current window of focus; and
   collecting information about a size of total screen area used.

30. A system for energy-aware software control in a computer system, comprising:
   a central processing unit (CPU);
   a memory embodying program code to be fetched and executed by the CPU;
   a display capable of supporting control of screen portions via their respective display parameters;
   a user interface, the display and user interface being directly or indirectly controlled by the CPU;
   a monitor configured to monitor power metrics of a computer system power source;
   an energy model creator using as an input profiling parameters to create an energy model; and
   an energy-aware software control means capable of controlling the respective display parameters of the screen portions based on the energy model.

31. The system of claim 30 wherein the power source is a battery and the power metrics include battery current, and wherein monitoring the battery current allows automatic prompting of the energy-aware software control.

32. The system of claim 31 wherein automatic prompting of the energy-aware software control occurs when the battery goes below a threshold value.

* * * * *